US012617360B2

(12) United States Patent
Farooq et al.

(10) Patent No.: US 12,617,360 B2
(45) Date of Patent: May 5, 2026

(54) RETRACTABLE BUMPER ASSEMBLY WITH ACTUATOR BASED ON VEHICLE SPEED

(71) Applicant: Ford Global Technologies, LLC, Dearborn, MI (US)

(72) Inventors: S.M. Iskander Farooq, Novi, MI (US); Mohammad Omar Faruque, Ann Arbor, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 362 days.

(21) Appl. No.: 18/320,303

(22) Filed: May 19, 2023

(65) Prior Publication Data

US 2024/0383425 A1      Nov. 21, 2024

(51) Int. Cl.
B60R 19/38          (2006.01)
(52) U.S. Cl.
CPC .................................... B60R 19/38 (2013.01)
(58) Field of Classification Search
CPC ..................................................... B60R 19/38
See application file for complete search history.

(56) References Cited

U.S. PATENT DOCUMENTS

| | | | |
|---|---|---|---|
| 2,094,739 A | 10/1937 | Geiger | |
| 2,142,328 A | 1/1939 | Mutter | |
| 3,756,643 A | 9/1973 | Weed | |
| 5,029,919 A | 7/1991 | Bauer | |
| 6,050,624 A | 4/2000 | Kim | |
| 6,393,999 B1 | 5/2002 | Schneider | |
| 6,871,889 B2 * | 3/2005 | Ericsson | B60R 19/28 293/133 |
| 6,976,718 B2 | 12/2005 | Nakanishi | |
| 8,113,555 B2 | 2/2012 | Faruque | |
| 8,246,091 B1 | 8/2012 | Jayasuriya et al. | |
| 8,544,905 B2 | 10/2013 | Handing et al. | |
| 9,067,552 B1 | 6/2015 | Cheng et al. | |
| 9,227,585 B1 | 1/2016 | Barbat et al. | |
| 10,875,480 B2 | 12/2020 | Fichtinger et al. | |
| 12,208,758 B2 | 1/2025 | Farooq et al. | |
| 2011/0042975 A1 * | 2/2011 | Faruque | B60R 19/34 293/118 |

(Continued)

FOREIGN PATENT DOCUMENTS

| | | |
|---|---|---|
| CN | 209479608 U | 10/2019 |
| CN | 112455373 A | 3/2021 |

(Continued)

OTHER PUBLICATIONS

Non-Final Office Action for U.S. Appl. No. 17/934,218, filed Sep. 22, 2022, as issued by the USPTO Jun. 4, 2024.

*Primary Examiner* — Dany E Akakpo
(74) *Attorney, Agent, or Firm* — Frank A. MacKenzie; Brooks Kushman P.C.

(57)                    ABSTRACT

A vehicle includes a bumper assembly. The bumper assembly includes a bumper, a rod fixed relative to the bumper and elongated along an axis, and a bracket spaced from the bumper along the axis of the rod. The bracket movably receives the rod. An actuator is supported by the bracket and is releasably engageable with the rod. A spring is on the rod between the bumper and the bracket. The spring biases the bumper away from the bracket.

19 Claims, 7 Drawing Sheets

(56) References Cited

U.S. PATENT DOCUMENTS

| | | | |
|---|---|---|---|
| 2012/0098280 A1* | 4/2012 | Handing | F16F 7/125 |
| | | | 293/118 |
| 2013/0238197 A1 | 9/2013 | Faruque et al. | |
| 2017/0259766 A1 | 9/2017 | Farooq et al. | |
| 2019/0275981 A1 | 9/2019 | Farooq et al. | |
| 2025/0269813 A1 | 8/2025 | Faruque et al. | |

FOREIGN PATENT DOCUMENTS

| | | | |
|---|---|---|---|
| DE | 102005021725 A1 | 11/2006 | |
| JP | 2004161109 A | 6/2004 | |

* cited by examiner

RETRACTABLE BUMPER ASSEMBLY WITH ACTUATOR BASED ON VEHICLE SPEED

BACKGROUND

The Global Technology Regulation (GTR) and the New Car Assessment Program (NCAP) specify leg-injury criteria for pedestrian protection. The regulations are aimed at reducing the impact force to the legs of a pedestrian by a vehicle bumper during certain vehicle-pedestrian impacts.

Some vehicles, such as light duty trucks and sport utility vehicles (SUVs), for example, may have a bumper height that could lead to an uneven impact on the femur and/or tibia of the pedestrian by the vehicle bumper during certain vehicle-pedestrian impacts. For example, light duty trucks may have bumper heights to provide ground clearance to clear speed bumps, curbs, parking blocks, inclined driveway ramps, hills, rough roads, etc. Some vehicles with such bumper heights also have off-road capabilities that preclude having any components below the bumper. As such, a design for the vehicle front-end is investigated for pedestrian leg impact energy management while addressing ground clearance requirements.

DETAILED DESCRIPTION

Figure 1:
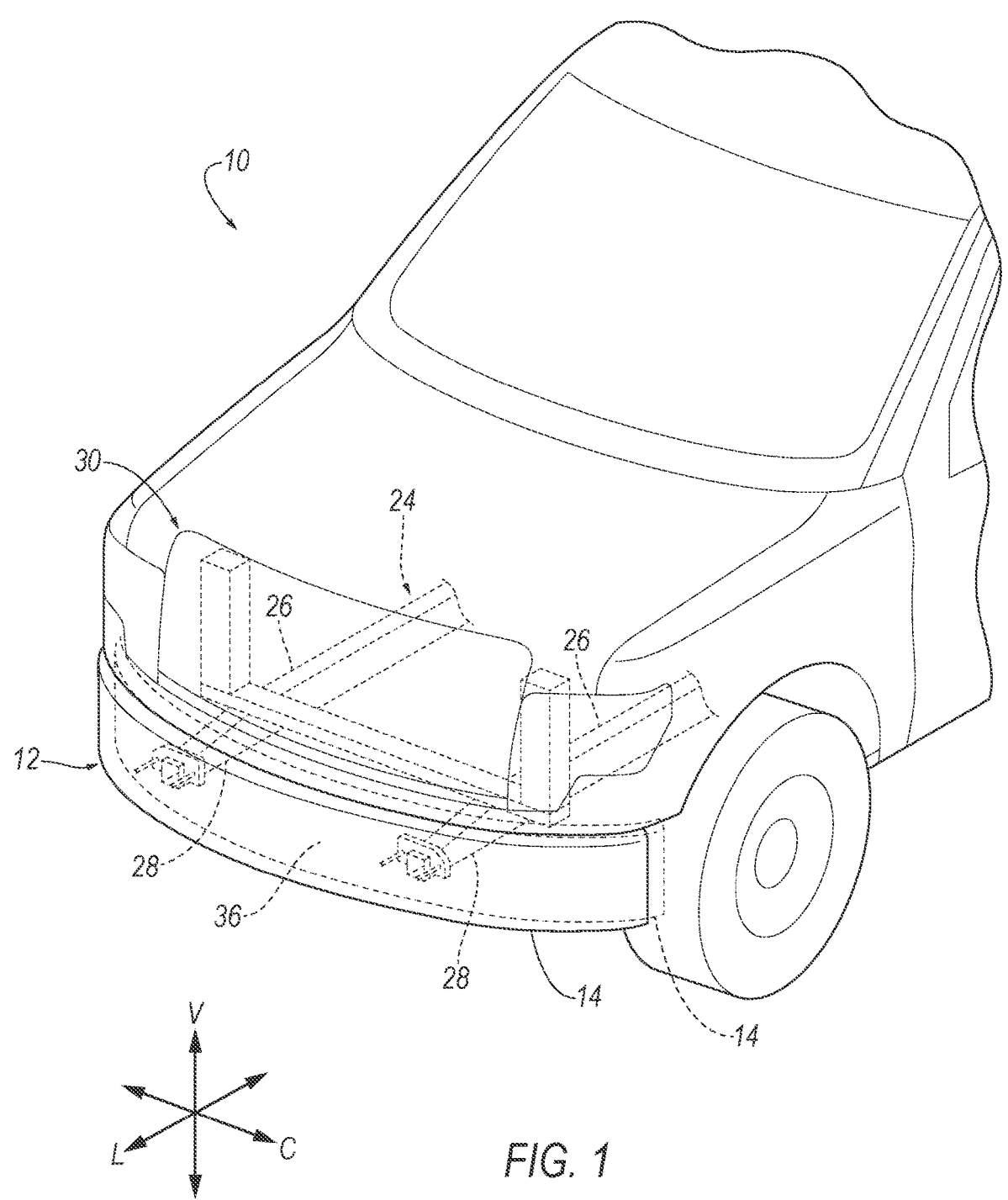
FIG. 1 is a perspective view of a vehicle including a bumper assembly with an energy-absorbing system in broken lines and with a retracted position of a bumper shown in broken lines.

A vehicle-bumper assembly includes a bumper and a rod fixed relative to the bumper. The rod is elongated along an axis. The vehicle-bumper assembly includes a bracket spaced from the bumper along the axis of the rod, the bracket movably receiving the rod. The vehicle-bumper assembly includes an actuator supported by the bracket and releasably engageable with the rod. The vehicle-bumper assembly includes a spring on the rod between the bumper and the bracket, the spring biasing the bumper away from the bracket.

The actuator may be movable relative to the rod between an engaged position engaged with the rod and a disengaged position disengaged with the rod. The rod may be moveable axially relative to the bracket when the actuator is in the disengaged position and the rod may be fixed axially relative to the bracket when the actuator is in the engaged position.

The rod may include a groove. The actuator is movable relative to the rod between an engaged position engaged with the groove and a disengaged position disengaged with the groove. The actuator may include a solenoid supported by the bracket and a gate supported by the solenoid. The solenoid is configured to move the gate relative to the rod to selectively engage the gate with the groove.

The actuator may include a solenoid selectively engageable with the rod.

The rod may include a distal end distal to the bumper. The bracket may be between the bumper and the distal end of the rod. The vehicle-bumper assembly may include a retainer fixed to the rod. The bracket is between the bumper and the retainer and the retainer is sized to retain the bracket between the bumper and the retainer.

The spring may be polymeric.

The spring may be coaxial with the rod.

The bracket may be configured to be fixed relative to a vehicle frame.

A vehicle includes a bumper and a vehicle frame. A rod is fixed relative to the bumper and elongated along an axis. A bracket is fixed relative to the vehicle frame and is spaced from the bumper along the axis of the rod. The bracket movably receives the rod. An actuator is supported by the bracket and is releasably engageable with the rod. A spring is on the rod between the bumper and the bracket. The spring biases the bumper away from the bracket.

The vehicle may include a computer having a processor and memory storing instructions executable by the processor to: disengage the actuator from the rod when a speed of the vehicle is within a predetermined speed range; and engage the actuator with the rod when a speed of the vehicle is outside of the predetermined threshold.

The rod may be moveable axially relative to the bracket when the actuator is disengaged with the rod and may be fixed axially relative to the bracket when the actuator is engaged with the rod.

The rod may include a groove. The actuator is movable relative to the rod to engage the groove to engage the actuator with the rod and to disengage the groove to disengage the actuator with the rod. The actuator may include a solenoid supported by the bracket and a gate supported by the solenoid. The solenoid is configured to move the gate relative to the rod to selectively engage the gate with the groove.

With reference to the Figures, wherein like numerals indicate like parts throughout the several views, a vehicle 10 includes a bumper assembly 12. The bumper assembly 12 includes a bumper 14, a rod 16 fixed relative to the bumper 14 and elongated along an axis A. and a bracket 18 spaced from the bumper 14 along the axis of the rod 16. The bracket 18 movably receives the rod 16. An actuator 20 is supported by the bracket 18 and is releasably engageable with the rod 16. A spring 22 is on the rod 16 between the bumper 14 and the bracket 18. The spring 22 biases the bumper 14 away from the bracket 18.

When the actuator 20 is disengaged from the rod 16, the rod 16 is free to move relative to the bracket 18 along the axis A of the rod 16 and when the actuator 20 is engaged with the rod 16, the rod 16 is fixed axially relative to the bracket 18. As described further below, the actuator 20 may be selectively engaged with the rod 16 based on vehicle speed, e.g., disengaged with the rod 16 when the vehicle speed is within a predetermined speed range and engaged with the rod 16 at vehicle speeds outside of the predetermined speed range. In the event of certain vehicle impacts in which the bumper 14 impacts an object, e.g., a crash test leg form as described further below, the bumper 14 is retractable vehicle rearward from a design position (shown in solid lines in FIG. 1) to a retracted position (shown in broken lines in FIG. 1) when the actuator 20 is disengaged from the rod 16. Specifically, when the actuator 20 is disengaged from the rod 16, force against the bumper 14 during certain vehicle impacts of sufficient magnitude to compress the spring 22 will move the bumper 14 and the rod 16 vehicle rearward relative to the bracket 18. For example, during impact with a leg form, the bumper 14 and rod 16 move vehicle rearward against the bias of the spring 22 to absorb energy from the impact and reduce energy delivered from the bumper 14 to the leg form. In such examples, the bumper assembly 12 may be resettable to the design position. In other words, since the spring 22 biases the bumper 14 away from the bracket 18, when force is removed from the bumper 14, the spring 22 may return the bumper 14 to the design position. The resettable movement of the rod 16 relative to the bracket 18 during such impacts relieves packaging constraints of the bumper assembly 12.

The bumper 14, as an example, may impact the knee of a pedestrian impact test leg form during a standardized test. The leg form may be a flexible pedestrian leg impactor (Flex-PLI) leg form. Example regulations that can use the leg form include Global Technical Regulation (GTR), ECE R127 and Korean Motor Vehicle Safety Standards (KMVSS). Example new car assessment programs that can use the leg form include EuroNCAP, CNCAP, and ANCAP.

The vehicle 10 may be any suitable type of automobile, e.g., a passenger or commercial automobile such as a sedan, a coupe, a truck, a sport utility vehicle, a crossover vehicle, a van, a minivan, a taxi, a bus, etc. The vehicle 10, as an example, may have a relatively high ride height. With reference to FIG. 1, the vehicle 10 defines a vehicle-longitudinal axis L extending between a front end (not numbered) and a rear-end (not numbered) of the vehicle 10. The vehicle 10 defines a vehicle-lateral axis C extending cross-vehicle from one side to the other side of the vehicle 10. The vehicle 10 defines a vertical axis V. The vehicle-longitudinal axis L, the vehicle-lateral axis A, and the vertical axis V are perpendicular relative to each other.

With reference to FIG. 1, the vehicle 10 includes a vehicle frame 24 and a vehicle body (not numbered). The vehicle body and the vehicle frame 24 may have a body-on-frame construction (also referred to as a cab-on-frame construction) in which the vehicle body and vehicle frame 24 are separate components, i.e., are modular, and the vehicle body is supported on and affixed to the vehicle frame 24. In the example shown in the Figures, the vehicle 10 has a body-on-frame construction. As another example, the vehicle body and the vehicle frame 24 may be of a unibody construction in which the vehicle frame 24 is unitary with the vehicle body (including frame rails 26, pillars, roof rails, etc.). In other examples, the vehicle frame 24 and vehicle body may have any suitable construction. The vehicle frame 24 and vehicle body may be of any suitable material, for example, steel, aluminum, and/or fiber-reinforced plastic, etc.

The vehicle body includes body panels (not numbered). The body panels may include structural panels, e.g., rockers, pillars, roof rails, etc. The body panels may include exterior panels. The exterior panels may present a class-A surface, e.g., a finished surface exposed to view by a customer and free of unaesthetic blemishes and defects. The body panels include, e.g., a roof panels, doors, fenders, hood, decklid, etc. The vehicle body may define a passenger cabin to house occupants, if any, of the vehicle 10.

The vehicle frame 24 includes frame rails 26 and may include cross beams. The frame rails 26 are elongated along the vehicle-longitudinal axis L. The frame rails 26 are spaced from each other cross-vehicle, i.e., along the vehicle-lateral axis C. The cross beams of the vehicle frame 24 extend from one frame rail 26 to the other frame rail 26 transverse to the vehicle-longitudinal axis A.

With continued reference to FIG. 1, the vehicle frame 24 includes two frame rails 26. The frame rails 26 may define the cross-vehicle boundaries of the vehicle frame 24. The frame rails 26 may be elongated along the vehicle-longitudinal axis A from a rear end of the vehicle 10 to a front end of the vehicle 10. For example, the frame rails 26 may extend along substantially the entire length of the vehicle 10. In other examples, the frame rails 26 may be segmented and extend under portions of the vehicle 10, e.g., at least extending from below a passenger compartment of the vehicle 10 to the front end of the vehicle 10. In some examples, each frame rails 26 may be unitary from the rear end of the vehicle 10 to the front end of the vehicle 10. In other examples, the frame rails 26 may include segments fixed to each other (e.g., by welding, threaded fastener, etc.) and in combination extending from a rear end of the vehicle 10 to the front end of the vehicle 10.

As set forth above, the vehicle frame 24 may have a body-on-frame construction in which the vehicle body is supported on and affixed to the vehicle frame 24. In such an example, the frame rails 26 may include cab mount brackets (not shown) on which the vehicle body is supported and affixed. The cab mount brackets are fixed to the frame rails 26, e.g., welded to the frame rails 26. The cab mount brackets may extend outboard from the frame rail 26. The cab mount bracket may be cantilevered from the frame rail 26. The cab mount brackets are configured to support the vehicle body in a body-on-frame configuration. For example, the cab mount bracket may include a post or a hole 42 that receives a hole 42 or a post, respectively, of the vehicle body to connect the vehicle body to the vehicle frame 24. Specifically, the vehicle body may be fixed to the cab mount bracket. During assembly of the vehicle 10, the vehicle body is set on the vehicle frame 24 with fastening features of the vehicle body aligned with the cab mount brackets for engagement with the cab mount brackets.

The vehicle frame 24 may include suspension and steering attachment points (not shown) that support suspension and steering components of the vehicle 10. As one example, the suspension and steering attachment points may be suspension towers. Suspension and steering components of the vehicle 10 are connected to the vehicle frame 24, at least in part, at the suspension towers. The suspension and steering components include suspension shocks, suspension struts, steering arms, steering knuckles, vehicle 10 wheels, etc.

The frame rails 26 and cross-beams may be extruded, roll-formed, etc. The frame rails 26 and cross-beams of the vehicle frame 24 may be of any suitable material, e.g., suitable types of steel, aluminum, and/or fiber-reinforced plastic, etc. The frame rails 26 and cross-beams may be hollow. The frame rails 26 and cross-beams may be rectangular in cross-section (e.g., a hollow rectangular cuboid), round in cross section, e.g., a hollow, round such as a hollow cylinder), etc.

Figure 2:
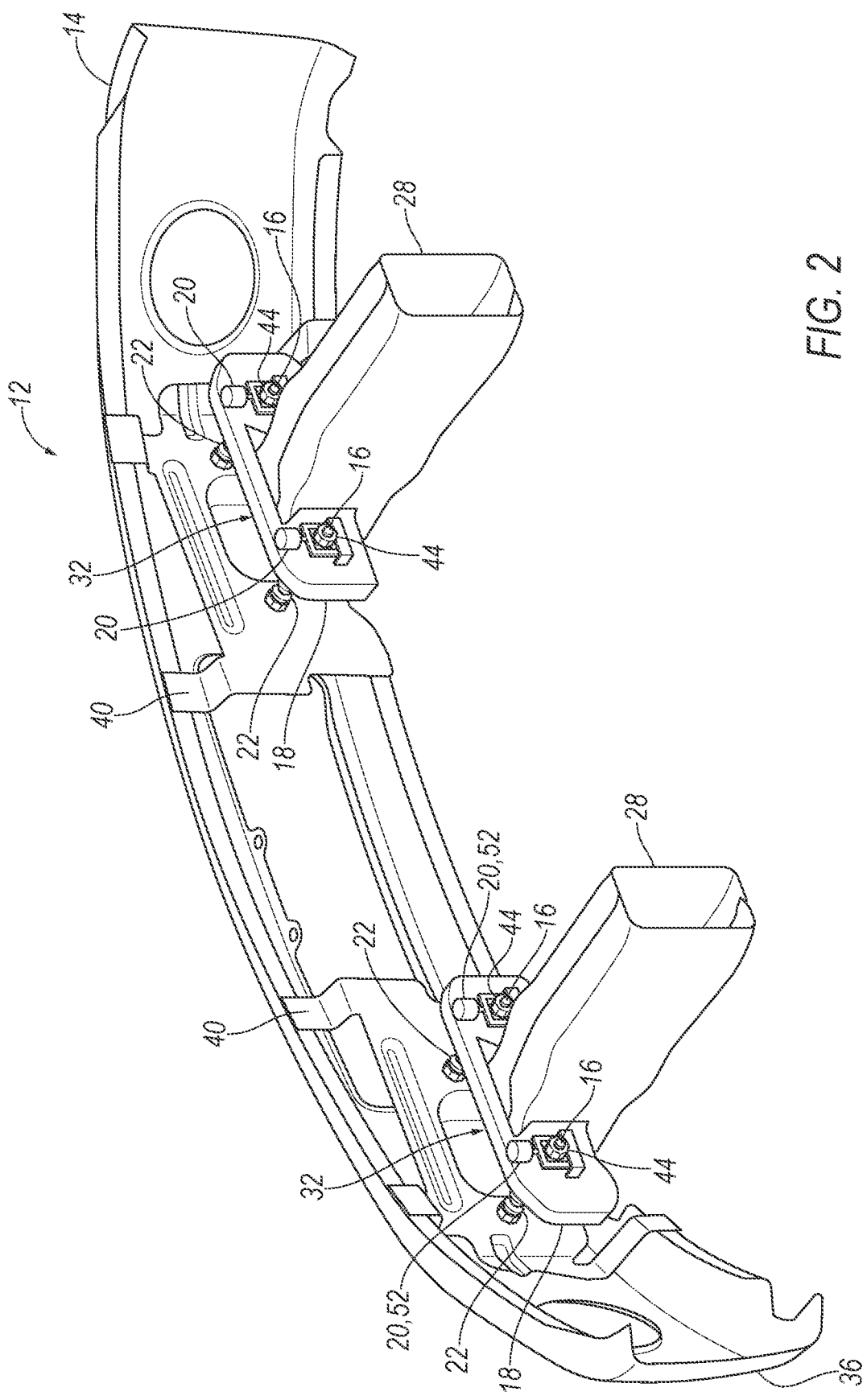
FIG. 2 is a rear view of the bumper assembly and a portion of a vehicle frame.

With reference to FIGS. 1 and 2, the vehicle frame 24 includes frame-rail ends 28 extending vehicle-forward of the frame rails 26, respectively. In other words, the vehicle frame 24 includes two frame-rail ends 28 with one frame-rail end 28 extending vehicle-forward of one of the frame rails 26 and the other frame-rail end 28 extending vehicle-forward of the other frame rail 26.

The frame-rail end 28 is fixed the respective frame rail 26. For example, the frame-rail end 28 may be fixed to the respective frame rail 26 by welding, fastening, etc. In the example shown in the Figures, the frame-rail end 28 is a component of the vehicle frame 24 that has a body-on-frame architecture, as described above. In other examples, the vehicle frame 24 may be of another architecture, e.g., a unibody architecture. In such examples, the frame rail 26 is a component of the vehicle frame 24 that has a unibody architecture and the frame-rail end 28 is connected to such frame rail 26.

The frame-rail end 28 is elongated along the vehicle-longitudinal axis L. For example, the frame-rail end 28 may be coaxial with the frame rail 26 at the connection of the frame-rail end 28 and the frame rail 26. The frame rail 26 has a vehicle-forward end and the frame-rail end 28 extends vehicle-forward from the vehicle-forward end of the frame rail 26. Specifically, the frame-rail end 28 has a vehicle-rearward end at the frame rail 26 and a vehicle-forward end proximate the bumper 14. The frame-rail end 28 may be extruded, roll-formed, etc. The frame-rail end 28 may be of any suitable material, e.g., suitable types of steel, aluminum, and/or fiber-reinforced plastic, etc. The frame-rail end 28 may be hollow, i.e., the bore makes the frame-rail end 28 hollow. The frame rails 26 and cross-beams may be rectangular in cross-forward section (e.g., a hollow rectangular cuboid), round in cross section, e.g., a hollow, round such as a hollow cylinder), etc.

The frame-rail ends 28 are designed to deform relative to the frame rail 26 during frontal-vehicle impact. Specifically, the frame-rail ends 28 deform vehicle-rearward to allow rearward movement of the bumper assembly 12 relative to the frame rails 26 to absorb energy during certain vehicle impacts. The frame-rail ends 28 may include features that direct deformation of the frame-rail end 28 toward the frame rail 26 during frontal impact of the bumper 14. These features may include wall geometry, wall thickness, dimples, cutouts, etc. The frame-rail ends 28 may be referred to in industry as crush cans.

With reference to FIG. 1, the vehicle 10 has a front-end structure 30. The front-end structure 30 includes a grill and the bumper assembly 12. The grill is above the bumper assembly 12. The grill may be a component of the vehicle body and may be supported on other components of the vehicle body.

Figure 6:
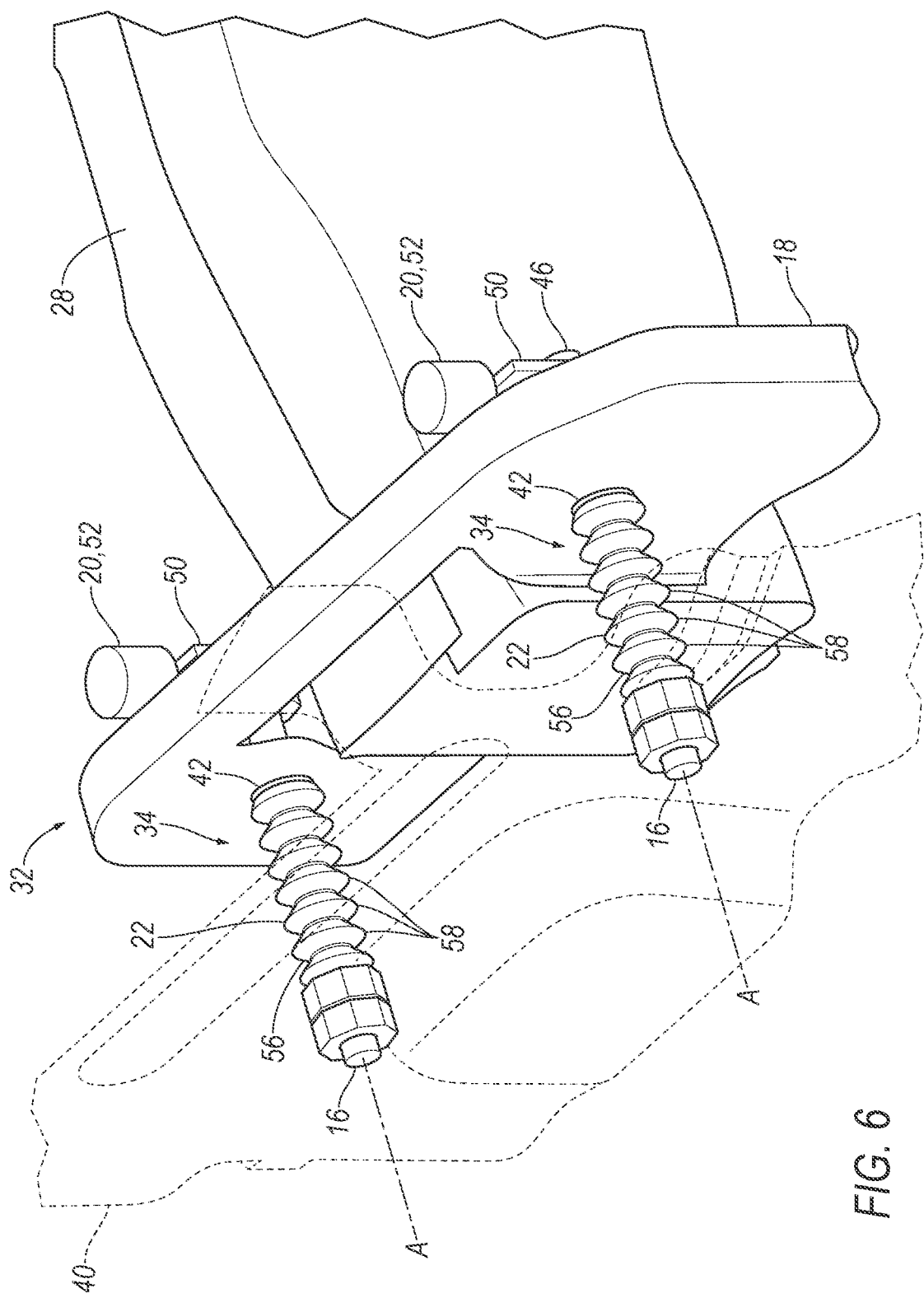
FIG. 6 is a perspective view of the bumper assembly on the vehicle frame.

The bumper assembly 12 includes an energy-absorber assembly 32 between the vehicle frame 24 and the bumper 14, for example, between the vehicle frame 24 and the mounting bracket 40 of the bumper 14 as shown in the example in the Figures (see, for example, FIG. 6). The energy-absorber assembly 32 extends from the vehicle frame 24 to the bumper 14. The energy-absorber assembly 32 includes the bracket 18 fixed relative to the vehicle frame 24, an energy absorber 34 extending from the bracket 18 to the bumper 14, and an actuator 20 that selectively fixes the energy absorber 34 to the bracket 18, i.e., locks the energy absorber 34 to the bracket 18. The energy absorber 34 includes the rod 16 extending from the bracket 18 to the bumper 14 and the spring 22 on the rod 16 between the bumper 14 and the bracket 18. In the example shown in the Figures, the bumper assembly 12 includes two energy-absorber assemblies 32, specifically one energy-absorber assembly 32 between each frame-rail end 28 and the bumper 14. In other examples, the bumper assembly 12 may include any suitable number of energy-absorber assemblies 34, i.e., one or more. In the example shown in the Figures, each energy-absorber assembly 32 includes two energy absorbers 34, specifically one on either side of the respective frame-rail end 28 along the vehicle-lateral axis C of the vehicle 10. Common numerals are used in the Figures to identify common features among the energy-absorber assemblies 32 and energy absorbers 34. In other examples, the energy-absorber assembly 32 may include any suitable number of energy absorbers 34, i.e., one or more.

The bumper assembly 12 is supported by the vehicle frame 24, i.e., the weight of the bumper assembly 12 is borne by the vehicle frame 24. Specifically, the energy-absorber assembly 32 supports the bumper 14 on the vehicle frame 24. In other words, the weight of the bumper 14 is borne by the energy-absorber assembly 32 and the weight of the energy-absorber assembly 32 and the bumper 14 is borne by the vehicle frame 24 through the connection of the energy-absorber assembly 32 to the vehicle frame 24. The bumper assembly 12 may be a front bumper assembly, as shown in the example in the Figures. In other words, the bumper assembly 12 may be at a front of the vehicle 10 and, in such examples, the bumper retraction is operable for certain frontal collisions of the vehicle 10.

The bumper 14 extends transversely to the frame rails 26. With reference to FIG. 1, the bumper 14 is elongated along the vehicle-lateral axis C. The bumper 14 may be of any suitable material such as metal (steel, aluminum, etc.), fiber-reinforced plastic, etc.

The bumper 14 has a vehicle-forward face 36 and a vehicle-rearward face 38. The vehicle-forward face 36 may be a class-A surface, i.e., a surface specifically manufactured to have a high-quality, finished aesthetic appearance free of blemishes. As an example, the vehicle-forward face 36 may be chromed. The bumper 14 may have a mounting bracket 40 on the vehicle-rearward face 38 of the bumper 14, as shown in the example in the Figures. The mounting bracket 40 is fixed to and moves as a unit with the rest of the mounting bracket 40.

The bracket 18 fixed relative to the vehicle frame 24. In other words, the bracket 18 moves as a unit with the vehicle frame 24. The bracket 18 may be fixe directly to the vehicle frame 24. The bracket 18 may be fixed to the vehicle frame 24 by mechanical attachment that requires removal by a service technician with the use of a tool and/or destruction such as cutting, e.g., cutting material and/or welded joints, etc. In the example shown in the Figures, the bracket 18 is fixed directly to the vehicle frame 24. As an example shown in the Figures, the bracket 18 may be fixed directly to the frame-rail end 28. The bracket 18 may be fixed to the vehicle frame 24 in any suitable way such as fasteners, welding, etc.

The bracket 18 is configured to be fixed relative to a vehicle frame 24. The bracket 18 is sized and shaped for connection to the vehicle frame 24. In the example shown in the Figures, the bracket 18 includes a U-shaped cutout that receives the frame-rail end 28. The bracket 18 may include locating features, mounting holes (e.g., for threaded fasteners), connection flanges (e.g., for locating, receiving threaded fasteners, and/or welding), etc.

The bracket 18 is spaced from the bumper 14 vehicle rearward from the bumper 14. The bracket 18 is spaced from the bumper 14 along the axis A of the rod 16. The axis A of the rod 16 may be, for example, parallel to the vehicle-longitudinal axis L.

The bumper 14 is movable along the axis A of the rod 16 between the design position and the retracted position during certain vehicle impacts, as described herein. The bracket 18 movably receives the rod 16. For example, as shown in the example in the Figures, the bracket 18 may define a hole 42 extending through the bracket 18, i.e., spaced from the outer periphery of the bracket 18 and the hole 42 slidably receives the rod 16. The rod 16 slides along the hole 42 axially along the axis A of the rod 16 and the bumper 14 moves between the design position and the retracted position. The hole 42 may be elongated along the axis A of the rod 16. In some examples, the hole 42 may be elongated along the vehicle-longitudinal axis L. In other examples, the bracket 18 may include any suitable track, channel, etc., that slidably receives the rod 16.

In the example shown in the Figures, the bumper assembly 12, specifically the energy absorber 34, includes a retainer 44 fixed to the rod 16 to retain the rod 16 to the bracket 18, e.g., in the hole 42. The bracket 18 is between the bumper 14 and the retainer 44. The retainer 44 is sized to retain the bracket 18 between the bumper 14 and the retainer 44. In the example shown in the Figures in which the bracket 18 includes holes 42 slidably receiving the rods 16, the retainer 44 is larger than the hole 42 so that the retainer 44 does not pass through the hole 42 when the spring 22 biases the bumper 14 to the design position. The rod 16 includes a distal end 46 distal to the bumper 14. The bracket 18 is between the bumper 14 and the distal end 46 of the rod 16. The retainer 44 may be fixed to the distal end 46 of the rod 16, e.g., by threaded engagement, welding, unitary formation, etc.

The rod 16 is elongated along the axis A of the rod 16. In other words, the longest dimension of the rod 16 is along the axis. The rod 16 may be, for example, cylindrical, as shown in the example in the Figures. The rod 16 may be, for example, metal or any other suitable material. The rod 16, or the rods 16 in examples including more than one rod 16, has sufficient rigidity to support the bumper 14 on the vehicle frame 24 and sufficient rigidity to transfer linear movement of the bumper 14 relative to the vehicle frame 24 during movement of the bumper 14 between the design position and the retracted position.

The rod 16 is fixed relative to the bumper 14 and selectively movable relative to the bracket 18. The rod 16 may be fixed to the bumper 14 by mechanical attachment that requires removal by a service technician with the use of a tool and/or destruction such as cutting, e.g., cutting material and/or welded joints, etc. In the example shown in the Figures, the rod 16 includes an end extending through the mounting bracket 40 of the bumper 14 that is threaded with opposing threaded fasteners on opposite sides of the mounting bracket 40.

The rod 16 is moveable axially relative to the bracket 18 when the actuator 20 is in the disengaged position, e.g., slidable axially through the hole 42 when force applied to the bumper 14 compresses the spring 22 when the actuator 20 is in the disengaged position. The rod 16 is fixed axially relative to the bracket 18 when the actuator 20 is in the engaged position, i.e., the actuator 20 locks the rod 16 to the bracket 18 in the engaged position.

The actuator 20 is supported by the bracket 18 and releasably engageable with the rod 16. The actuator 20 is movable relative to the rod 16 between an engaged position (FIG. 4) engaged with the rod 16 and a disengaged position (FIG. 3) disengaged with the rod 16. The rod 16 is moveable axially relative to the bracket 18 (i.e., can translate along the axis A) when the actuator 20 is in the disengaged position and the rod 16 is fixed axially relative to the bracket 18 (i.e., cannot translate along the axis A) when the actuator 20 is in the engaged position. When the actuator 20 is disengaged with the rod 16, the bumper 14 is moveable from the design position to the retracted position in response to certain vehicle impacts that are sufficient to compress the spring 22, as described further below. When the actuator 20 is engaged with the rod 16, the bumper 14 is not movable relative to the bracket 18 at the rod 16. In such instances, in the event of certain vehicle impacts, force is transmitted from the bumper

14, through the rod 16 and bracket 18 to the frame-rail end 28. The frame-rail end 28 may deform to absorb energy of certain vehicle impacts force is delivered to the frame-rail end 28 through the rod 16 and bracket 18.

Figure 3:
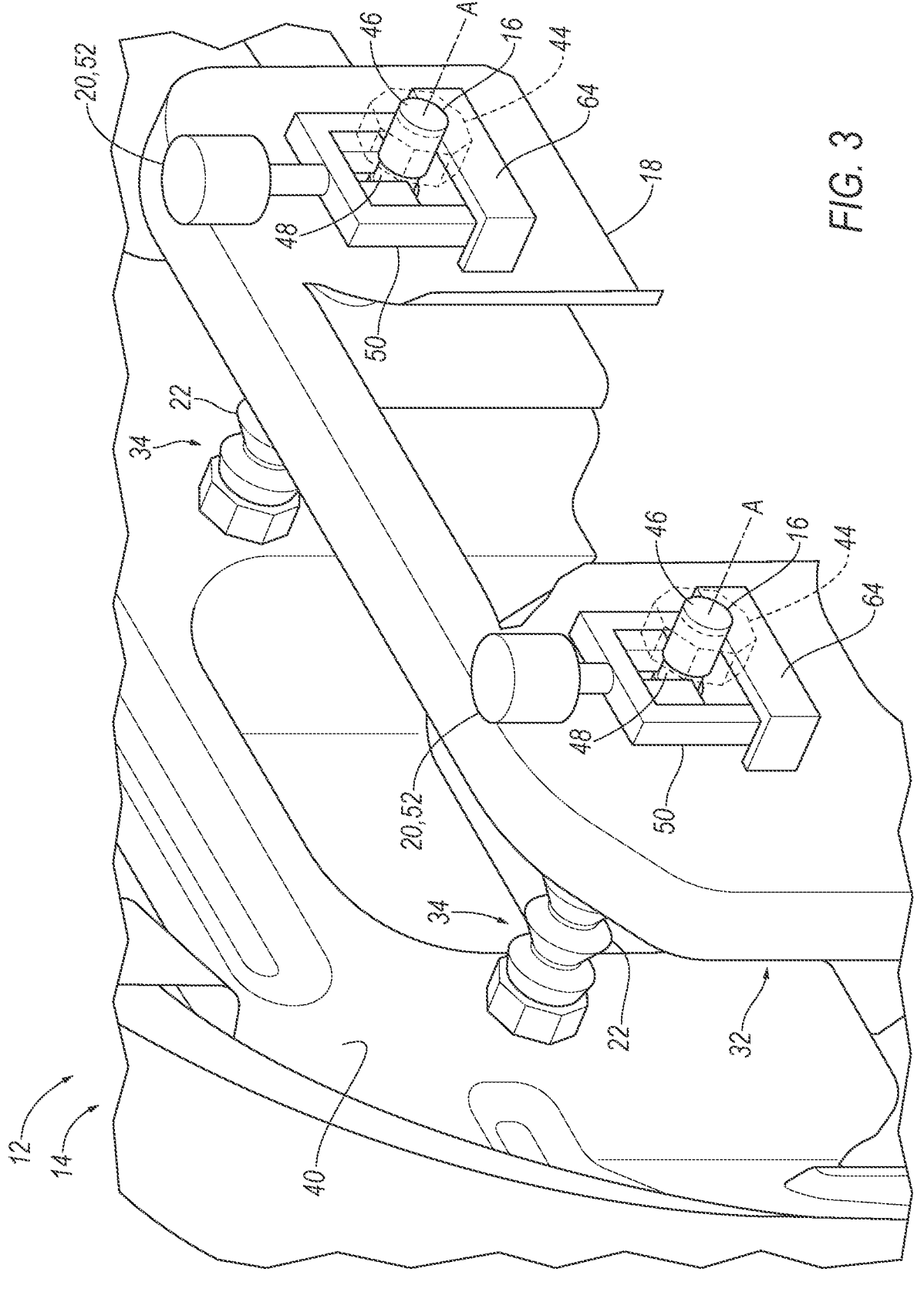
FIG. 3 is a magnified view of a portion of FIG. 2 an actuator in an engaged position.
Figure 4:
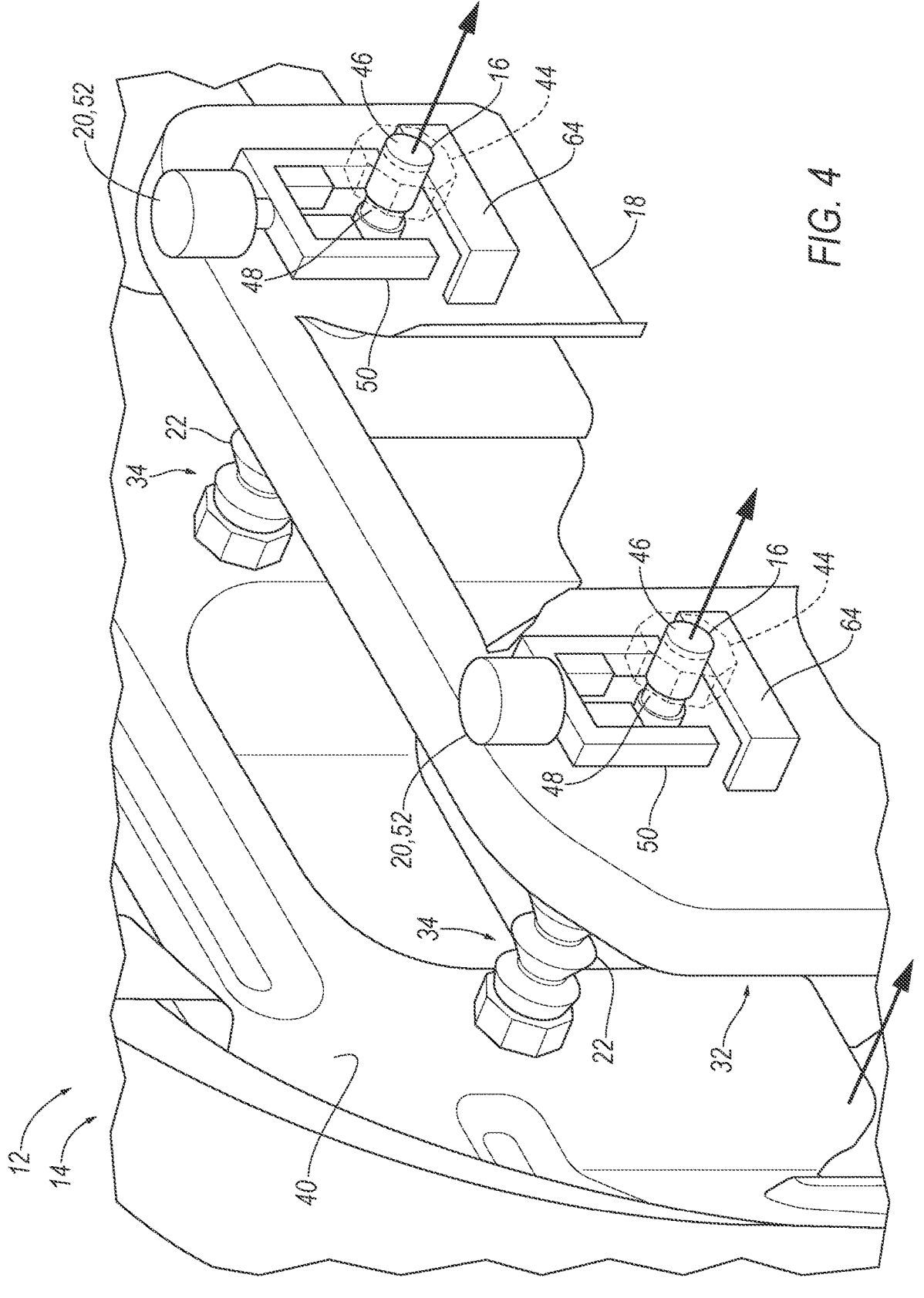
FIG. 4 is the view of FIG. 3 with the actuator in a disengaged position.

In the example shown in the Figures, the rod 16 includes a groove 48 selectively engageable by the actuator 20. The actuator 20 is movable relative to the rod 16 between the engaged position engaged with the groove 48 and the disengaged position disengaged with the groove 48. Specifically, the actuator 20 may include a gate 50 that engages the groove 48 in the engaged position (FIG. 3) is disengaged from the groove 48 in the disengaged position (FIG. 4). The direction of axial movement of the rod 16 and movement of the bumper 14 from the design position toward the retracted position is shown with arrows in FIG. 4. The gate 50 prevents axial movement of the rod 16 relative to the bracket 18 when engaged with the groove 48. The groove 48 may extend circumferentially around the rod 16, i.e., endlessly, or the groove 48 may be discrete, i.e., does not extend endlessly around the rod 16. The groove 48 is aligned axially with the gate 50 when the bumper 14 is in the design position. The bumper assembly 12, specifically the energy-absorbing assembly 32, may include a keeper 64 that receives the gate 50 in the engaged position. Specifically, the gate 50 extends downwardly into the keeper 64 and the keeper 64 prevents movement of the gate 50 along the axis A of the rod 16 in such a position, as shown in FIG. 3. The gate 50 is spaced from the keeper 64 when the gate 50 is in the disengaged position, as shown in FIG. 4.

The actuator 20 may include a solenoid 52 supported by the bracket 18. The solenoid 52 is configured to move the gate 50 relative to the rod 16 to selectively engage the rod 16. When engaged with the rod 16, the rod 16 is fixed axially relative to the bracket 18 in the engaged position and the rod 16 is movable axially relative to the bracket 18 in the disengaged position, as set forth above. In examples including the gate 50, the gate 50 is supported by the solenoid 52 (i.e., the weight of the gate 50 is borne by the solenoid 52) and the solenoid 52 moves the gate 50 relative to the rod 16 into and out of engagement with the groove 48, as described above. The solenoid 52 may be of any suitable type, including those known in the art. The solenoid 52 is electronically controlled by a vehicle computer 54, e.g., a body control module, as described further below. Specifically, as described further below, the vehicle computer 54 may control the actuator 20 based on speed of the vehicle 10.

The spring 22 is on the rod 16 between the bumper 14 and the bracket 18. In the example shown in the Figures, the spring 22 abuts the bumper 14, specifically the mounting bracket 40, and abuts the bracket 18. When the actuator 20 is in the disengaged position, the spring 22 is compressed between the bumper 14 and the bracket 18 and absorbs energy from the bumper 14 during certain vehicle impacts having sufficient force to compress the spring 22. The compression of the spring 22 and associated energy absorption may reduce energy delivered from the bumper 14 to the impacted object, e.g., a leg form in a vehicle impact test.

Figure 5:
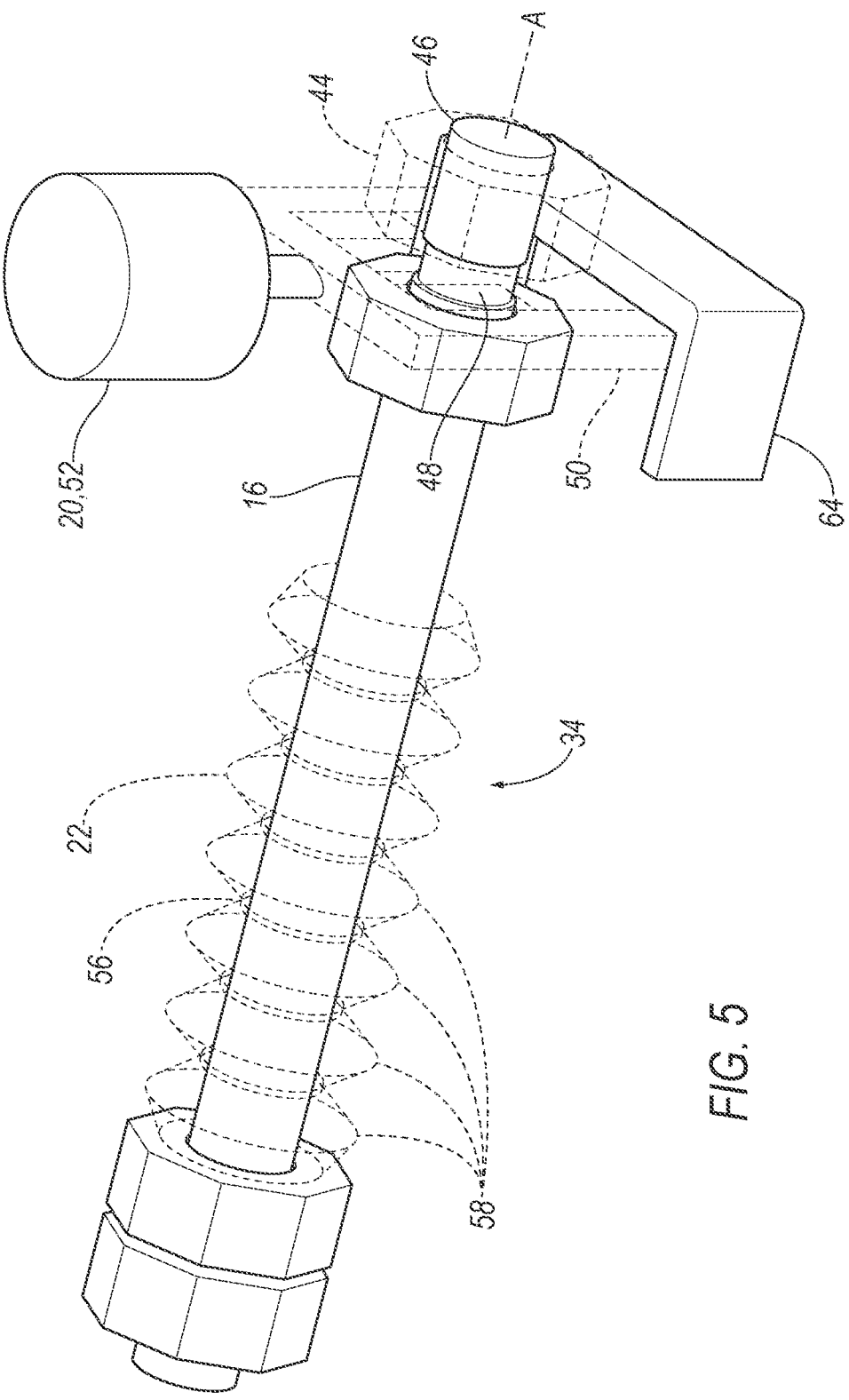
FIG. 5 is a perspective view of the energy-absorbing assembly with a bracket of the energy-absorbing assembly not shown for illustrative purposes.

The spring 22 may be coaxial with the rod 16, as shown in the example in the Figures. In other words, the spring 22 may be elongated along the axis A of the rod 16 with an elongated hole receiving the rod 16, as shown in FIG. 5. The spring 22 may be polymeric. As examples, the spring 22 may be polyurethane foam, microcellular polyurethane, rubber, etc. In such examples, as shown in the Figures, the spring 22 includes a shaft 56 and rings 58 extending circumferentially around the shaft 56. The rings 58 are spaced from each other along the axis A. The shaft 56 and the rings 58 may be unitary, i.e., formed for a single, uniform piece of material with no seams, joints, fasteners, or adhesives holding the rings 58 and shaft 56 together, e.g., formed by simultaneously molding. In examples including the shaft 56 and the rings 58, the size of the shaft 56 and the spacing and size of the rings 58 may be tuned to design energy absorbing characteristics of the spring 22. In other examples, the spring 22 may be metal, e.g., may be a coil spring 22.

The spring 22 biases the bumper 14 away from the bracket 18. The spring 22 is resiliently compressed when the bumper 14 moves from the design position to the retracted position. In other words, as set forth above, the spring 22 may be compressed between the bumper 14 and the bracket 18 during certain vehicle impacts. In such instances, the spring 22 is compressed from a design position not a compressed position as the bumper 14 moves from the design position to the retracted position. When the spring 22 is in the compressed position, when the force is removed from the bumper 14, the spring 22 decompresses and returns to the design position of the spring 22. During decompression, the spring 22 moves the bumper 14 from the retracted position to the design position. In the design position, the actuator 20 may engage the rod 16 as described above, e.g., based on speed of the vehicle 10. In such examples, the bumper assembly 12 is resettable due to the decompression of the spring 22 and return of the spring 22 and the bumper 14 to the design position.

Figure 7:
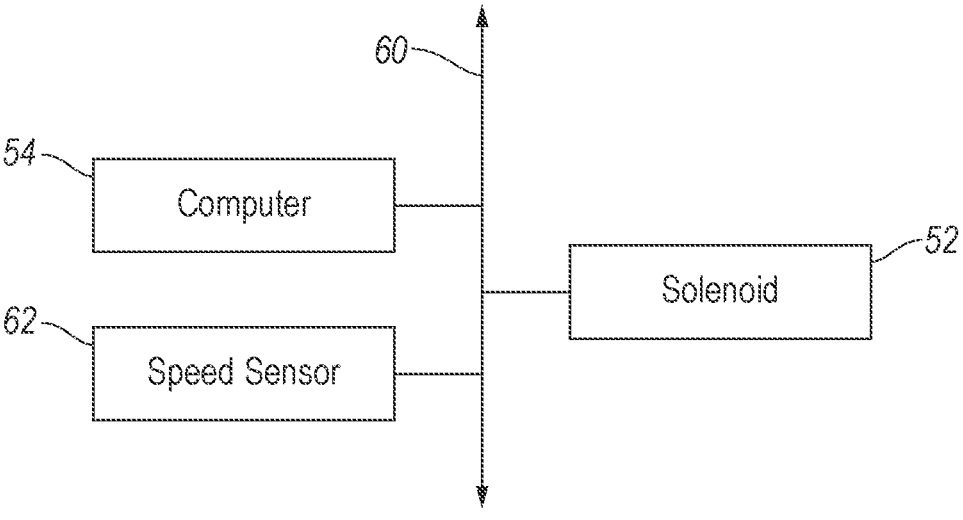
FIG. 7 is a block diagram of a system of the vehicle.

With reference to FIG. 7, the vehicle 10 includes the vehicle computer 54 including a processor and a memory. The computer 54 may be a body control module. The memory includes one or more forms of computer readable media, and stores instructions executable by the computer for performing various operations, including as disclosed herein and including, for example, process shown in FIG. 8 and described below. For example, the computer 54 may be a generic computer with a processor and memory as described above and/or may include an electronic control unit ECU or controller for a specific function or set of functions, and/or a dedicated electronic circuit including an ASIC (application specific integrated circuit) that is manufactured for a particular operation, e.g., an ASIC for processing sensor data and/or communicating the sensor data. In another example, the computer may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in the computer. The memory may be of any type, e.g., hard disk drives, solid state drives, servers, or any volatile or non-volatile media. The memory may store the collected data sent from the sensors. The memory may be a separate device from the computer, and the computer may retrieve information stored by the memory via a vehicle communication network 60, e.g., over a CAN bus, a wireless network, etc. Alternatively or additionally, the memory may be part of the computer, e.g., as a memory of the computer.

As shown in FIG. 7, the computer is generally arranged for communications on the vehicle communication network 60 that may include a bus in the vehicle 10 such as a controller area network CAN or the like, and/or other wired and/or wireless mechanisms. Alternatively or additionally, in cases where the computer 54 includes a plurality of devices, the vehicle communication network 60 may be used for communications between devices represented as the computer in this disclosure. Further, as mentioned below, various controllers and/or sensors may provide data to the computer via the vehicle communication network 60.

With reference to FIG. 7, the vehicle 10 includes a speed sensor 62 that detects the speed the vehicle 10 is moving relative to ground. The speed sensor 62 may be of any suitable type, including, in some examples, those known in the art. The speed sensor 62 may be, for example, a wheel-speed sensors 62 that measuring the rotational speed of a vehicle 10 wheel. In other examples, the speed sensor 62 may be of any suitable type. The speed sensor 62 is in communication with the vehicle computer 54, e.g., through the vehicle 10 communication network 60.

Figure 8:
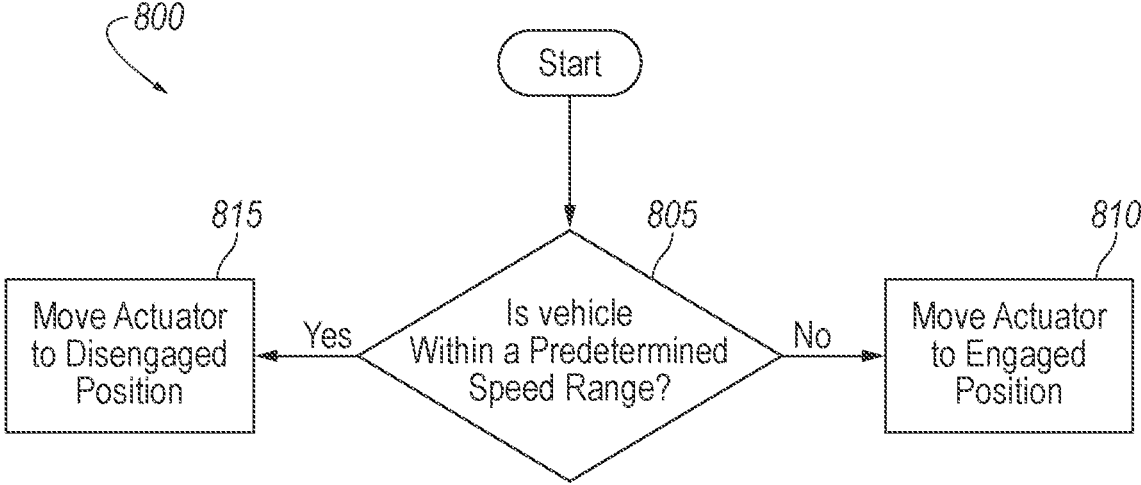
FIG. 8 is a flow chart showing an example process.

With reference to FIG. 8, the computer stores instructions to control components of the vehicle 10 according to the method 800 shown in FIG. 8. Use of "in response to," "based on," and "upon determining" herein, including with reference to FIG. 7, indicates a causal relationship, not merely a temporal relationship.

As shown in FIG. 8, the method engages the actuator 20 with the rod 16 when the speed of the vehicle 10 is within a predetermined speed range and disengages the actuator 20 from the rod 16 when the speed of the vehicle 10 is outside of the predetermined speed range. As an example, the predetermined speed range may have a lower boundary above zero. In such examples, the speed of the vehicle 10 may be outside of the predetermined speed range by being above or below the predetermined speed range. As one example, the predetermined speed range may be 22-50 kph. The predetermined speed range is stored in the vehicle computer 54, i.e., is predetermined.

With reference to block 805, the method includes determining whether the speed of the vehicle 10 is within the predetermined speed range. The vehicle computer 54 may determine whether the speed of the vehicle 10 is within the predetermined speed range based on data from the speed sensor 62 indicating the speed that the vehicle 10 is traveling.

With reference to block 810, if the speed of the vehicle 10 is outside of the predetermined speed range, the method 700 includes moving the actuator 20 to the engaged position. For example, in the example in which the actuator 20 includes the solenoid 52 and the gate 50, as shown in the Figures, the vehicle computer 54 instructs the solenoid 52 to move the gate 50 into engagement with the rod 16, e.g., into engagement with the groove 48. The solenoid 52 maintains the gate 50 in engagement with the rod 16 while the vehicle 10 travels at a speed outside of the predetermined speed range.

With reference to block 815, if the speed of the vehicle 10 is within the predetermined speed range, the method 700 includes moving the actuator 20 to the disengaged position. For example, in the example in which the actuator 20 includes the solenoid 52 and the gate 50, as shown in the Figures, the vehicle computer 54 instructs the solenoid 52 to move the gate 50 to disengage the rod 16, e.g., to disengage the groove 48. The solenoid 52 maintains the gate 50 disengaged with the rod 16 while the vehicle 10 travels at a speed within the predetermined speed range.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle-bumper assembly comprising:
a bumper;
a rod fixed relative to the bumper and elongated along an axis;
a bracket spaced from the bumper along the axis of the rod, the bracket movably receiving the rod;
the rod including a distal end distal to the bumper, the bracket being between the bumper and the distal end of the rod;
an actuator supported by the bracket and releasably engageable with the rod; and
a spring on the rod between the bumper and the bracket, the spring biasing the bumper away from the bracket.

2. The vehicle-bumper assembly as set forth in claim 1, wherein the actuator is movable relative to the rod between an engaged position engaged with the rod and a disengaged position disengaged with the rod.

3. The vehicle-bumper assembly as set forth in claim 2, wherein the rod is moveable axially relative to the bracket when the actuator is in the disengaged position and the rod is fixed axially relative to the bracket when the actuator is in the engaged position.

4. The vehicle-bumper assembly as set forth in claim 1, wherein the rod includes a groove, the actuator being movable relative to the rod between an engaged position engaged with the groove and a disengaged position disengaged with the groove.

5. The vehicle-bumper assembly as set forth in claim 4, wherein the actuator includes a solenoid supported by the bracket and a gate supported by the solenoid, the solenoid being configured to move the gate relative to the rod to selectively engage the gate with the groove.

6. The vehicle-bumper assembly as set forth in claim 1, wherein the actuator includes a solenoid selectively engageable with the rod.

7. The vehicle-bumper assembly as set forth in claim 1, further comprising a retainer fixed to the rod, the bracket being between the bumper and the retainer, and the retainer being sized to retain the bracket between the bumper and the retainer.

8. The vehicle-bumper assembly as set forth in claim 1, wherein the spring is polymeric.

9. The vehicle-bumper assembly as set forth in claim 1, wherein the spring is coaxial with the rod.

10. The vehicle-bumper assembly as set forth in claim 1, wherein the bracket is configured to be fixed relative to a vehicle frame.

11. The vehicle-bumper assembly as set forth in claim 1, wherein:
the actuator is movable relative to the rod between an engaged position engaged with the rod and a disengaged position disengaged with the rod; and
when the actuator is in the disengaged position, the spring biases the bumper away from the bracket in a design position and is resiliently compressible to allow the bumper to move from the design position to a retracted position.

12. The vehicle-bumper assembly as set forth in claim 11, wherein the rod is moveable axially relative to the bracket when the actuator is in the disengaged position and the rod is fixed axially relative to the bracket when the actuator is in the engaged position.

13. A vehicle comprising:
a bumper;
a vehicle frame;
a rod fixed relative to the bumper and elongated along an axis;
a bracket fixed relative to the vehicle frame and being spaced from the bumper along the axis of the rod, the bracket movably receiving the rod;
the rod including a distal end distal to the bumper, the bracket being between the bumper and the distal end of the rod;
an actuator supported by the bracket and releasably engageable with the rod; and
a spring on the rod between the bumper and the bracket, the spring biasing the bumper away from the bracket.

14. The vehicle as set forth in claim 13, further comprising a computer having a processor and memory storing instructions executable by the processor to:
disengage the actuator from the rod when a speed of the vehicle is within a predetermined speed range; and
engage the actuator with the rod when a speed of the vehicle is outside of the predetermined threshold.

15. The vehicle as set forth in claim 13, wherein the rod is moveable axially relative to the bracket when the actuator is disengaged with the rod and is fixed axially relative to the bracket when the actuator is engaged with the rod.

16. The vehicle as set forth in claim 13, wherein the rod includes a groove, the actuator being movable relative to the rod to engage the groove to engage the actuator with the rod and to disengage the groove to disengage the actuator with the rod.

17. The vehicle as set forth in claim 16, wherein the actuator includes a solenoid supported by the bracket and a gate supported by the solenoid, the solenoid being configured to move the gate relative to the rod to selectively engage the gate with the groove.

18. The vehicle as set forth in claim 13, wherein:
the actuator is movable relative to the rod between an engaged position engaged with the rod and a disengaged position disengaged with the rod; and
when the actuator is in the disengaged position, the spring biases the bumper away from the bracket in a design position and is resiliently compressible to allow the bumper to move from the design position to a retracted position.

19. The vehicle as set forth in claim 18, wherein the rod is moveable axially relative to the bracket when the actuator is in the disengaged position and the rod is fixed axially relative to the bracket when the actuator is in the engaged position.

* * * * *